United States Patent

Collins

[15] 3,635,543
[45] Jan. 18, 1972

[54] VARIABLE LIGHT TRANSMISSION DEVICE

[72] Inventor: James F. Collins, 104 Westerly Terrace, Hartford, Conn. 06105

[22] Filed: Dec. 29, 1969

[21] Appl. No.: 888,676

[52] U.S. Cl. ............................................. 350/159, 350/156
[51] Int. Cl. ......................................................... G02b 5/30
[58] Field of Search ........................... 350/147, 159, 153, 156

[56] References Cited

UNITED STATES PATENTS

| 2,526,889 | 10/1950 | McComb | 350/159 |
| 2,565,362 | 8/1951 | Loranta | 350/159 |
| 3,451,751 | 6/1969 | Stock | 350/159 |
| 2,773,422 | 12/1956 | Flynn, Sr. et al. | 350/159 |
| 2,856,810 | 10/1958 | Frost | 350/159 |

Primary Examiner—David Schonberg
Assistant Examiner—Michael J. Tokar
Attorney—Peter L. Costas

[57] ABSTRACT

At least two disks of polarizing material are pivotally mounted in a housing, along with at least one stationary sheet of light-polarizing material, to provide a variable light transmission device. The disks are mounted radially adjacent to one another with portions thereof in overlapping relationship, and the sheet of material is in superposed relationship to the disks to provide three layers of polarizing material within the area of overlap. The disks are mounted with their axes of polarization parallel, and they may be simultaneously pivoted in the same direction to vary the level of light passage therethrough. The device has particular applicability as a visor for use in vehicles.

11 Claims, 10 Drawing Figures

PATENTED JAN 18 1972

3,635,543

INVENTOR
JAMES F. COLLINS

BY Peter L. Costas
Attorney

VARIABLE LIGHT TRANSMISSION DEVICE

BACKGROUND OF THE INVENTION

Automobiles, trucks, buses and the like have been equipped for many years with visors designed to shade the driver's eyes from direct sunlight so as to decrease the glare as much as possible and to thereby improve safety and driving comfort. Normally, such visors are produced of an opaque material and this opacity is disadvantageous for two basic reasons. First of all, when a visor so constructed is in a suitable position to block sunlight to the desired degree, it frequently also dangerously obstructs the vision of the driver. Secondly, such a visor provides no relief during nighttime driving against the glare from headlights of oncoming vehicles, since to do so the visor would totally obstruct the driver's vision. In some instances, visors have been constructed of tinted transparent material to decrease interference with visibility, but they have proven inadequate due to the difficulty of achieving a level of interference with light transmission that is optimum under all conditions of desired usage.

Attempts have been made in the past to solve the foregoing problems by providing visors of variable light transmission, exemplary of which are the devices described in Frost U.S. Pat. No. 2,856,810 and Winchell U.S. Pat. Nos. 2,915,936 and 2,915,937. However, so far as is known, none of the adjustable visors described in the prior art are entirely satisfactory. As a result of the effort to maximize the effective area of polarization for varying the light transmission, they tend to be unduly cumbersome and unsightly, and they do not provide a uniform effect throughout the entire area of light passage over substantially the full range of gradation in light polarization.

Accordingly, it is an object of the present invention to provide a relatively compact and attractive variable light transmission device with a relatively large area of light passage that is of a desirable configuration.

It is also an object of the invention to provide such a device wherein a uniform effect is afforded throughout the entire area of light passage and over substantially the full range of gradation in light polarization.

Another and more specific object of the invention is to provide a visor for use in vehicles, which visor achieves the foregoing objects and which is also relatively simple and inexpensive to produce.

SUMMARY OF THE INVENTION

It has now been found that the foregoing and related objects can be readily attained in a variable light transmission device comprising a housing having at least an area of transparency, and at least two similar disks of light-polarizing material. The disks are pivotally mounted within the housing in the area of transparency with their axes of polarization substantially parallel. They are radially adjacent to one another so that portions thereof lie in overlapping relationship. A sheet of light-polarizing material is fixedly mounted within the housing in a superposed relationship to the disks, thereby providing three layers of polarizing material within the area of overlap of the disks. There is provided means for simultaneously pivoting the disks in the same direction about their pivotal axes, and the area of transparency of the housing is dimensioned and configured to permit the passage of light through the device in the area of overlap of the disks.

In the preferred device the sheet of polarizing material is positioned exteriorly of the disks and is dimensioned and configured to be at least coextensive with the total area covered by them. A second sheet of light-polarizing material is desirably mounted in a stationary position within the housing in superposed relationship to the disks and to the first sheet of polarizing material, with the axes of polarization of the first and second sheets being substantially parallel. The second sheet provides polarizing material in superposed relationship to the disks only at the areas thereof other than that in which the overlapping relationship exists, thereby providing three layers of polarizing material outside of the area of overlap. When a second sheet is employed, each of the disks is desirably positioned exteriorly of the sheets.

The device may include a multiplicity of disks (at least three) mounted in the manner previously described, and the disks may be located in two adjacent planes. When so located, at least one disk in one plane is positioned with its axis of pivoting between the axes of pivoting of two radially adjacent disks in the other plane, so that portions of the one disk lie in overlapping relationship with a portion of each of the disks in the other plane. The disks should be pivotable through an angle of about 90° from an initial low transmission position, wherein the axis of polarization of the disks and of the stationary sheet are substantially perpendicular to one another, to a final high transmission position, wherein those axes are substantially parallel. Preferably the axes of polarization of the disks and sheet in the final position are at an angle of about 30° to one another, and the disks are pivotable through an angle of about 60°.

In a further embodiment, the device includes a third sheet of light-polarizing material that is fixedly mounted within the housing in superposed relationship to the disks and to the first and second sheets of polarizing material, with the axis of polarization of all of the sheets being substantially parallel. Both the second and the third sheets have circular apertures of a diameter substantially equal to that of the disks; the second sheet is positioned with the aperture thereof axially aligned with one of the disks, and the third sheet is positioned with the aperture thereof axially aligned with the other of the disks. This arrangement provides three layers of polarizing material outside of the area of overlap of the disks.

The housing of the device may comprise a pair of transparent sheets between which the disks and sheet of polarizing material are mounted. There is provided means for securing the transparent sheets in close proximity, and means for masking all peripheral areas of the device at which there are not present three layers of polarizing material. Preferably, the securing means comprises a frame within which the transparent sheets are seated; the frame may have elements providing the masking means, and it may also have means for affixing the device to a vehicle body to provide a visor therefor.

DETAILED DESCRIPTION OF THE ILLUSTRATED EMBODIMENT

Figure 1:
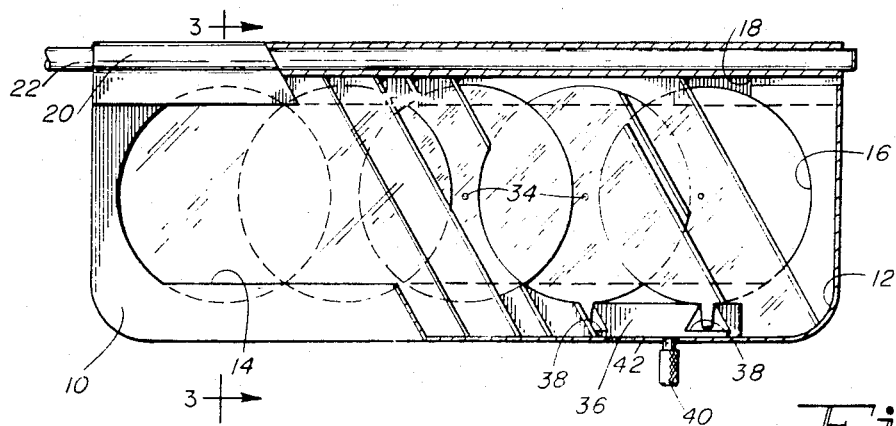
FIG. 1 is a front elevational view of a visor embodying the present invention, partially sectioned by a series of successively deeper cuts taken at intervals along its length to illustrate elements at several transverse planes.
Figure 2:
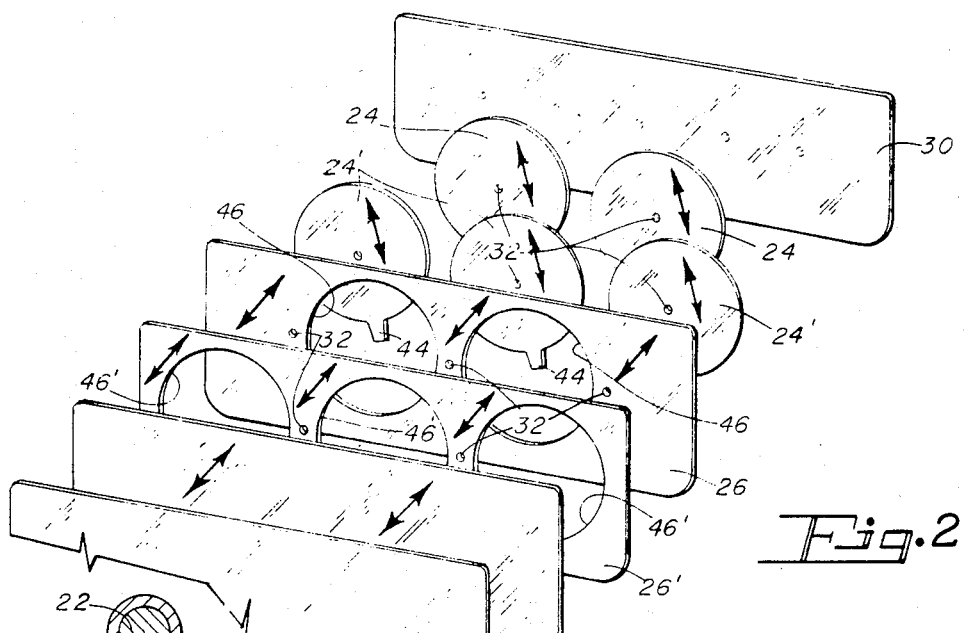
FIG. 2 is an exploded perspective view, to a reduced scale, of the planar elements of the visor of FIG. 1, with the forwardmost element fragmentarily illustrated.
Figure 3:
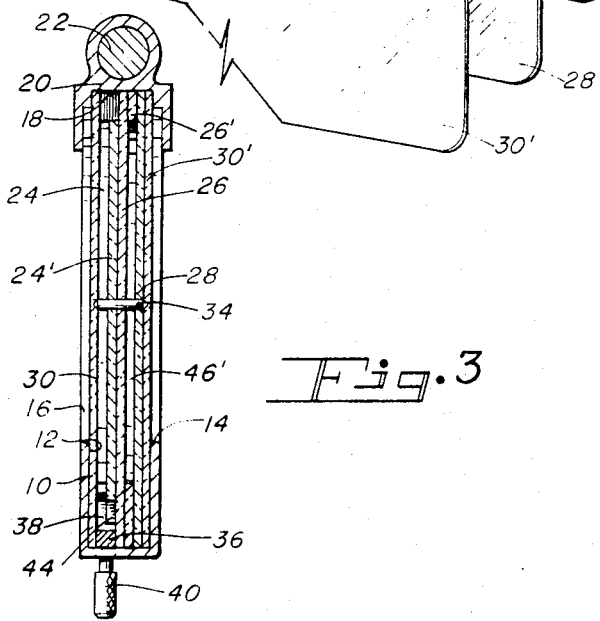
FIG. 3 is a sectional view, to an enlarged scale, along the line 3—3 of FIG. 1.

Turning now in detail to the appended drawing, there is illustrated a polarizing visor having a generally rectangular lower frame section, generally designated by the numeral 10, with an interior channel 12 and front and rear windows 14, 16 providing aligned areas of transparency. The lower frame section 10 is engaged in the U-shaped channel 18 of an elongated sleeve 20, which in turn provides a pivotal mounting upon a rod 22 by which the visor is attached to a support structure (not shown) such as an automobile body.

Two outer sheets 30 of clear synthetic plastic material are seated in the channel 12 of the lower frame section 10 and serve to house therebetween elements of polarizing material, including five disks 24, 24', two apertured sheets 26, 26', and one integral sheet 28 thereof. Each of the polarizing elements 24, 26 and 28 is provided with one or more apertures 32, through which are inserted small pins 34 that are somewhat pointed at both ends thereof. When assembled between the sheets 30 of clear plastic, the ends of the pins 34 become embedded therein and serve to maintain the elements, particularly the disks 24, 24', against lateral displacement while also providing an axis for pivoting thereof. It will be appreciated that each of the disks 24 is axially aligned with one of the circular openings 46 in the apertured sheet 26, and that each of the disks 24' is axially aligned with one of the circular openings 46' in the apertured sheet 26'.

A slide bar 36 having therein a series of upwardly opening truncated triangular slots 38 is slidably seated in the bottom of the lower frame section 10, and the slide bar 36 has a knurled handle 40 attached thereto which projects downwardly through the elongated opening 42 in the bottom of the lower frame section 10. Each of the disks 24, 24' has a small tab 44 projecting radially from its circumference, and each tab 44 is engaged in one of the triangular slots 38 of the slide bar 36. Due to the position of the tabs 44 on the disks 24, 24' and due to the angular relationship of the axes of polarization (indicated by the double-headed arrows) of the disks 24, 24', the apertured sheets 26, 26' and the solid sheet 28 of polarizing material, movement of the slide bar 36 from right to left in FIG. 1 will pivot the disks 24, 24' from an initial low light transmission position to a final high light transmission position and through gradations therebetween. As shown in FIG. 1, light transmission is at an intermediate level.

An outstanding advantage of the construction described and illustrated resides in the fact that a relatively long, narrow article may be produced, thereby providing a desirable visor configuration while utilizing the polarizing material in a most efficient manner. However, it may be desired to increase the width of the device somewhat, such as when it is to be used for protection against headlight glare. The number of disks that are employed in the device may vary and, although only two are actually necessary, at least three of them will generally be used. The use of five disks arranged as illustrated in the drawing is optimum to produce a visor of most general applicability and, when particularly large areas of light transmission are desired, the use of seven or more disks may prove most appropriate. It will be appreciated that the disks employed will normally be of a single diameter, the specific size thereof varying depending upon the application and the overall dimensions desired. However, the disks may be of different sizes, so long as the remaining criteria of operation are observed. Various diameters of disks may be suitable depending upon the overall dimensions of the final assembly; however, disks having a diameter from about 4 to 6 inches will normally be most appropriate.

Although the disks of polarizing material may all lie in a single plane with half of each disk in front and half behind the overlapping portion of the adjacent disks, they are preferably arranged in two planes with disks in one of the planes staggered behind those in the other plane to avoid binding and resultant serious problems in operation. The disks should be positioned so that the axes of polarization are maintained parallel regardless of the angular attitude thereof if uniformity of shading (i.e., light transmission) is to be obtained. For the same reason, the elements should be arranged so that no stationary polarizing element is positioned between the disks; similarly, no movable element should be positioned between two stationary sheets. These relationships may be expressed respectively by stating that the stationary sheets are positioned exteriorly of the disks, and vice versa.

To achieve a desirable level of uniformity of light transmission throughout the area of light passage, it is normally necessary that at least two stationary sheets of polarizing material be present. In such a case, one of the sheets is free of apertures (other than for passage of pins such as 34 in the drawing) and extends over the entire area of light transmissibility. The second sheet provides an additional thickness of material where necessary to furnish three polarizing layers (as are furnished by use of the two sheets 26, 26' in the drawing), and has suitably configured apertures in alignment with the disks at appropriate locations to avoid more than three layers at other places, such as where the disks overlap.

From the standpoint of convenience and efficiency of manufacture, it is most desirable to die-cut or otherwise produce the disks from sheets of material, which may themselves be used as the stationary sheets providing the layers of polarizing material in areas about the disks. As can be seen from the drawing, only three sheets of polarizing material are necessary to provide all of the disks and stationary sheets if such a technique is employed, and the end product is a device wherein the area of light passage is of uniform transmission throughout. It will be appreciated that when more than one sheet of polarizing material is employed, it will usually be most desirable to position all such sheets with their axes of polarization parallel to obtain the greatest range of gradations of light polarization while also minimizing the arc of pivoting of the disks.

In constructing the device, it may be most advantageous to sandwich the polarizing elements between two sheets of a clear, transparent material (e.g., a polymer such as poly methyl methacrylate, polycarbonate, etc.,) to produce a unified assembly, and the clear sheets should be held closely together to bear upon the elements therewithin to maintain them in position and prevent binding and warping. This close relationship may be accomplished by bending flanges of a frame inwardly, by fabricating the frame of an elastic material that has elements that can be spread initially for assembly and that will thereafter spring together to maintain force about the periphery, or by using mechanical elements such as pins, bolts, etc., at the corners for tightening after assembly.

The means providing the axes about which the disks pivot may conveniently be pointed pins of the type illustrated; use of such elements is particularly desirable because it minimizes the level of obstruction of the view through the device. However, other means may be preferable from the standpoint of security of assembly, such as rivets, other types of pins, screws, etc., which may be tightened to hold the elements together.

The means by which the disks are pivoted may also vary widely, and the slide bar illustrated is but one effective and simple expedient. Exemplary of other mechanisms that can be substituted are a cable and takeup spindle arrangement, a lever and tie rod combination, and a rack and pinion type of assembly. The disks will be designed to cooperate with the particular pivoting mechanism that is employed, and, in the illustrated embodiment, the tabs projecting from the periphery of the disk cooperate with the slide bar that is used for that purpose. These tabs may be integrally formed with the disks, or they may be added as a clip or like element secured thereto, the latter option being most desirable if the sheet from which the disks are produced is to be employed in the assembly. Otherwise, formation of the tab would cause an indentation to be formed in the circumference of the circular aperture of the sheet; this is objectionable because it would result in a visible discontinuity in the uniformity of light transmission. If cables or tie bars are used to pivot the disks, the latter may be provided with reinforced holes or the like for attachment; if a rack and pinion type of assembly is employed, the periphery of the disks will be provided with teeth, either by cutting them directly into each disk or by adding a toothed annulus thereabout. It may be preferred to position the pivoting mechanism at the top of the device to further decrease visual obstructions.

The tabs, or elements substituted therefor, must be accurately positioned relative to the axis of polarization of the disk if close control of the angular attitude thereof is to be possible. Although the disks may pivot through a full 90° quadrant to move the axes of polarization from a parallel position to one perpendicular to that of the stationary sheets present, it has been found that only 55° to 60° of arc (i.e., to achieve angles from 30° or 35° to 90° between the axes) is sufficient in terms of variation of light transmission. Accordingly, it is most desirable to limit movement of the pivoting means and/or of the disks to permit pivoting through an arc of only 60°, since this simplifies design of the device.

The housing may simply be a pair of sheets of transparent material mechanically pinned or cemented together with appropriate spacers therebetween. Preferably, a plastic or metal frame is utilized to achieve an attractive and desirably strong structure, and spacers may also be used there to prevent binding and interference between moving parts. The frame illustrated, consisting of the lower frame section 10 and the elongated sleeve 20, is particularly desirable both because it simplifies assembly and because it also provides masking about the periphery of the area of transmission. Alternatively, separate masking elements may be employed to render opaque any areas at which more or less than two layers of polarizing material are present. When the device is designed for use as a visor, the frame desirably has means for attachment to the support structure of the vehicle, and the various possibilities in this regard will be apparent and need not be discussed further. However, it should be appreciated that the device illustrated may either serve as a visor itself, or it may be incorporated into a padded visor of the conventional type to augment, with its own safety features, the inherent safety features thereof.

As employed herein, the term "polarizing material" refers to any material that permits the passage of light waves having a limited planar orientation. Exemplary materials are the commercially available cellulose films on which are uniformly deposited dichroic crystals, such as herapathite, tourmaline, etc., such as KN-36, a product of the Polaroid Corporation.

Thus, it can be seen that the present invention provides a relatively compact and attractive variable light transmission device that has a relatively large area of light passage that is of a desirable configuration, and wherein a uniform effect is afforded throughout the area of light passage and over substantially the full range of gradation in light polarization. The invention is particularly advantageous in providing a visor for use in vehicles, which visor has the foregoing advantages and features and which is relatively simple and inexpensive to manufacture.

Having thus described the invention, I claim:

1. A variable light transmission device comprising a housing having at least an area of transparency; a plurality of similar disks of light-polarizing material pivotally mounted within said housing in said area of transparency, said disks having substantially fixed axes of pivoting positioning said disks radially adjacent to one another with radial portions thereof in overlapping relationship and with the axes of polarization thereof substantially parallel; at least first and second sheets of light-polarizing material fixedly mounted within said housing in superposed relationship to said disks and with the axes of polarization of said first and second sheets being substantially parallel, said first sheet of polarizing material being dimensioned and configured to be substantially coextensive with the total area covered by said disks, and second sheet being dimensioned and configured to provide polarizing material in superposed relationship to said disks only at the areas thereof other than those in which said overlapping relationship exists; and means for simultaneously pivoting said disks in the same direction, said first sheet and said disks cooperatively providing three layers of polarizing material within the area of overlap of said disks, and said first and second sheets and said disks cooperatively providing three layers of polarizing material outside of said area of overlap, said area of transparency of said housing being dimensioned and configured to permit the passage of light through said device in areas at which three layers of polarizing material are present.

2. The device of claim 1 wherein each of said disks is positioned exteriorly of said sheets.

3. The device of claim 1 including at least three disks so mounted as to provide overlapping relationship.

4. The device of claim 3 wherein said disks are located in two adjacent planes, at least one disk in one plane being positioned with its axis of pivoting between the axes of pivoting two radially adjacent disks in the other plane, with portions of said one disk being in overlapping relationship with a portion of each of said disks in said other plane.

5. The device of claim 1 wherein said disks are pivotable through an angle of about 90° from an initial low transmission position to a final high light transmission position, the axes of polarization of said disks and of sheet being substantially perpendicular in said initial position and being substantially parallel in said final position.

6. The device of claim 5 wherein said axes of polarization of said disks and sheet in said final position are at an angle of about 30° relative to each other, and wherein said disks are pivotable through an angle of about 60°.

7. The device of claim 1 additionally including a third sheet of light-polarizing material fixedly mounted within said housing in superposed relationship to said disks and said first and second sheets of polarizing material and with the axes of polarization of all of said sheets being substantially parallel, each of said second and third sheets having a circular aperture of a diameter substantially equal to that of said disks, said second sheet being positioned with the aperture thereof axially aligned with one of said disks and said third sheet being positioned with the aperture thereof axially aligned with the other of said disks, to provide three layers of polarizing material outside of said area of overlap of said disks.

8. The device of claim 1 wherein said housing includes a pair of transparent sheets between which said disks and sheet of polarizing material are mounted, wherein means is provided to secure said transparent sheets in close proximity to each other with said disks and sheet therebetween, and wherein means is provided to mask all peripheral areas of said device at which there are not three layers of light-polarizing material.

9. The device of claim 8 wherein said securing means comprises a frame within which said transparent sheets are seated, wherein said frame has elements providing said masking means and has means for affixing said device to a vehicle body to provide a visor therefor.

10. The device of claim 1 additionally including a third sheet of light-polarizing material fixedly mounted within said housing in superposed relationship to said disks and said first and second sheets of polarizing material and with the axes of polarization of all of said sheets being substantially parallel, each of said second and third sheets having a circular aperture of a diameter substantially equal to that of said disks, said second sheet being positioned with the aperture thereof axially aligned with one of said disks and said third sheet being positioned with the aperture thereof axially aligned with the other of said disks, to provide three layers of polarizing material outside of said area of overlap of said disks, said sheets being positioned exteriorly of said disks and said disks being positioned exteriorly of said sheets.

11. The device of claim 10 including five of said disks of polarizing material and wherein said disks are about 4 to 6 inches in diameter.

* * * * *